Nov. 17, 1964
R. E. SEELY
3,157,762
SPEED RESPONSIVE SWITCH ARRANGEMENT FOR USE IN
CONTROLLING WINDING CIRCUITS OF SINGLE PHASE
REVERSIBLE ELECTRIC MOTORS
Filed Aug. 30, 1961
3 Sheets-Sheet 1
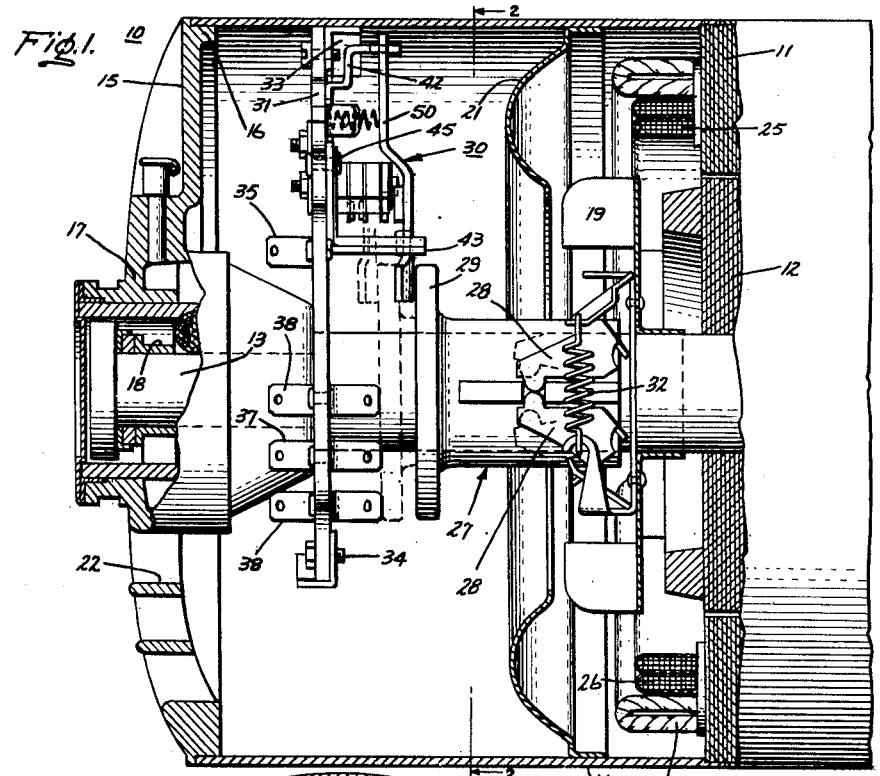
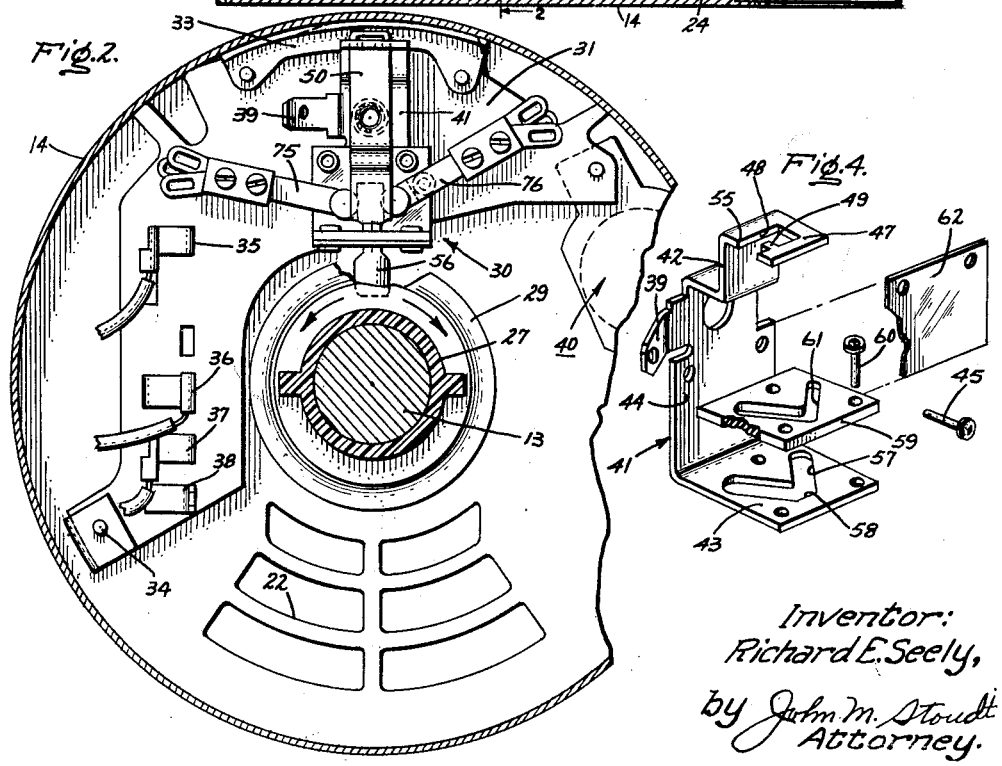
Inventor:
Richard E. Seely,
by John M. Stoudt
Attorney.

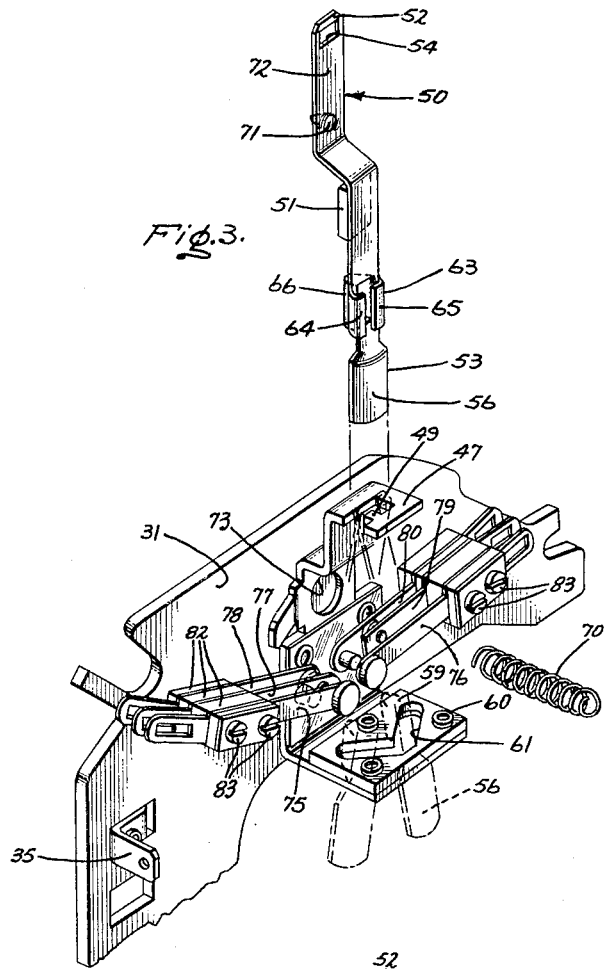
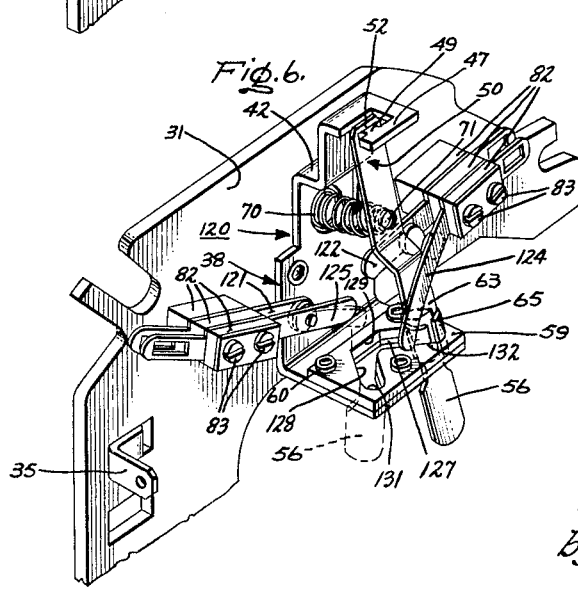

Nov. 17, 1964

R. E. SEELY 3,157,762

SPEED RESPONSIVE SWITCH ARRANGEMENT FOR USE IN
CONTROLLING WINDING CIRCUITS OF SINGLE PHASE
REVERSIBLE ELECTRIC MOTORS

Filed Aug. 30, 1961

*Inventor:*
*Richard E. Seely,*
*by John M. Stoutt*
*Attorney.*

United States Patent Office 3,157,762
Patented Nov. 17, 1964

3,157,762
SPEED RESPONSIVE SWITCH ARRANGEMENT FOR USE IN CONTROLLING WINDING CIRCUITS OF SINGLE PHASE REVERSIBLE ELECTRIC MOTORS
Richard E. Seely, Fort Wayne, Ind., assignor to General Electric Company, a corporation of New York
Filed Aug. 30, 1961, Ser. No. 135,007
10 Claims. (Cl. 200—80)

This invention relates to switch arrangements for dynamoelectric machines, and more particularly to switch assemblies of the speed responsive reversing type generally employed for controlling the winding circuits of single phase induction motors.

It is the general object of this invention to provide an improved reversing arrangement for a dynamoelectric machine, and more particular to provide an improved and durable switch assembly, for controlling the winding circuit of a split phase motor, which is adapted for use with a standard centrifugal switch operator and is responsive to the speed and direction of motor shaft rotation.

It is a further object of this invention to provide an improved switch assembly of simply yet sturdy construction, having relatively few component parts, which is economical to manufacture and to install.

Another object of the present invention is the provision of an improved speed responsive circuit selector and starting switch assembly and two separate starting winding arrangements for a split phase motor in which the switch modifies the starting winding circuit connections at a predetermined motor speed.

It is a still further and more specific object of the present invention to provide an improved and durable yet economical circuit selector switch assembly for a split phase motor in which is incorporated positive and novel means for directing that part of the switch influenced by the motion of a centrifugal operator into selective engagement with angularly spaced apart contacts, whereby the opening and closing of any particular motor circuit is determined and controlled through the switch by the direction and speed of motor shaft rotation.

In carrying out the objects of this invention in one form thereof, I provide an improved arrangement suitable for use in a split phase reversible motor having a main winding and two start windings. A switch assembly, arranged in cooperative relation with a speed responsive switch actuating device, comprises a base having spaced apart outstanding brackets and a switch operating member carrying a contact intermediate its ends. One end of the switch operating member is movably attached to one bracket, while the other bracket has means for guiding the member into and out of selective engagement with spaced apart contact elements which are connected in series circuit with the start windings. The guiding means, in one form, includes a substantially V-shaped channel with its apex disposed away from the base. The switch operating member projects through the channel and is normally biased toward the apex, out of engagement with the contact elements. The switch operating member has means arranged to be frictionally engaged by the actuating device whereby predetermined axial movement of the speed responsive device will overcome the biasing means and drive the switch operating member in the direction of motor rotation, from the apex to selective engagement with one of the start winding contact elements.

The subject matter which I regard as my invention is particularly pointed out and distinctly claimed in the concluding portion of the specification. My invention, itself, however, both as to its organization and mode of operation, together with further objects and advantages thereof, may best be understood by reference to the following description taken in connection with the accompanying drawings.

In the drawings, FIG. 1 is a side elevational view, partly in section, of one end of a small horsepower single phase split phase reversible induction motor which incorporates one form of the improved switch assembly of this invention therein;

FIG. 2 is a cross sectional view, partly broken away, taken along lines 2—2 in FIG. 1, to show my improved switch assembly in more detail;

FIG. 3 is a partially exploded view in perspective of the switch assembly of FIGS. 1 and 2 mounted on a terminal board member;

FIG. 4 is an exploded view in perspective of the stationary support base of my switch shown in FIG. 3;

FIG. 5 is a schematic circuit diagram, illustrating the improved switch assembly of FIGS. 1 through 4 inclusive in the motor circuit of the reversible single phase split phase motor of FIG. 1;

FIG. 6 is a view in perspective of my switch assembly in another form, mounted on a terminal board member; and FIG. 7 is a schematic motor circuit diagram showing the switch of FIG. 6 incorporated therein.

Referring now to the drawings in more detail, and specifically to FIG. 1, I have illustrated one form of my invention as being incorporated in a single phase split phase reversible induction motor 10 having a stationary core member or stator 11 of conventional construction and a rotor 12 fixedly secured to shaft 13. The rotor is shown as being provided with the well known cast squirrel cage winding. Stator 11 is supported within a cylindrical shell 14, closed at each end by an end shield assembly 15 which is secured to shell 14 by a rabbet connection, at 16. For simplicity of illustration, only one end shield has been shown and as illustrated, it is formed with a bearing housing 17 in which is housed a bearing 18 for rotatably supporting each end of shaft 13. A fan 19 is mounted on the shaft 13 and baffle member 21 is arranged within shell member 14. Openings 22 are formed in each end shield 15 and ventilating air is drawn through these openings by the fan 19 in the standard fashion and around the baffle member 21 to cool the interior portion of the motor.

In single phase split phase induction motors, one or more main or running windings are generally provided, together with a single starting winding, which is physically and electrically displaced from the main windings. Thus, energization of the main and start windings during starting conditions of the motor produces two phase starting flux. To illustrate my invention, however single phase motor 10 of the exemplification under consideration is of the reversible capacitor split phase type, in which stator 11 carries one main winding 24 and two substantially identical starting windings 25, 26 only one of which is energized with the main winding 24 during starting conditions to effect a given direction of rotation.

In the exemplification of FIGS. 1–5, the illustrated form of my improved switch assembly, generally identified by numeral 30, controls the direction of rotation of shaft 13 during starting by pre-selecting the particular start winding circuit to be closed, and also functions to disconnect the energized start winding from the power source when the speed of the motor exceeds a predetermined value.

In order to operate switch assembly 30 in the desired manner, a speed responsive or switch actuating device, such as that indicated by numeral 27, is mounted on shaft 13, adjacent one side of the rotor, for rotation therewith during operation of motor 10. This is shown as being a centrifugal mechanism of the type described in Patent 2,149,108 of A. F. Welch, assigned to the same assignee as the present application. This centrifugal mechanism includes a pair of weights 28 adapted to react upon centrifugal force at a predetermined speed to move push-collar 29 axially on shaft 13 for controlling the operation of switch assembly 30, and a pair of tension springs 32 for resiliently biasing the weights in the well known way.

My switch assembly 30 may be mounted in operative relation with push-collar 29 of the centrifugal mechanism in any suitable way, such as that illustrated in FIG. 1. For example, the switch may be supported adjacent the push-collar by a terminal board member 31, fastened within shell 14 between end shield 15 and baffle 21 by a pair of mounting lugs and brackets, denoted at 33 and 34. Member 31 is preferably formed of suitable insulating material such as fiberboard and carries substantially Z shaped terminal posts 35, 36, 37 and 38, each including male portions extending axially on either side of the terminal board member and adapted to be engaged with conventional female quick connect members (not shown). End shield 15 is provided with an opening (not shown) in communication with the posts permitting access to the interior of motor 10 for making the necessary external connections from one side of the posts to a suitable power source of single phase alternating current. In addition to carrying switch assembly 30 and terminal posts 35–38 inclusive, terminal board member 31 also supports an overload device 40 of standard design which is arranged adjacent one end thereof. The precise manner in which device 40 is connected in circuit with the motor winding will be explained hereinafter.

Referring now to the embodiment of switch assembly 30 illustrated by FIGS. 1–4 inclusive, it will be seen from an inspection of these figures that the switch includes a base 41, preferably stamped out of a single piece of electrical conductive substantially rectangular sheet material, such as relatively stiff steel, and bent into the desired configuration most clearly shown in FIGS. 3 and 4. More specifically, the ends of the stamped out piece are bent to form rear and forward upright or outstanding bracket sections 42 and 43, integrally joined together by a flat central bight section 44 having its bottom surface adapted to be secured to the terminal board member 31, intermediate the terminal posts and overload device 40 in any convenient fashion, as by a plurality of hollow type rivets 45. Bracket 42 is generally Z shaped to provide adequate electrical clearance with mounting lug and bracket 33 and has means at its outer end 47 for pivotally supporting one end 52 of a movable switch operating member 50 to move in a multiplanar manner. The supporting means preferably comprises a slot 48 extending transversely from one edge of bracket end 47 with a projection 49 provided on the upper wall of the slot.

Member 50 is actuated in response to axial movement of push-collar 29 and as best seen in FIG. 3, the member functions as the movable contact arm of switch assembly 30, carrying movable contact 51 intermediate its ends 52, 53. Accordingly, it is formed from suitable electric conductive rectangular sheet material, for example steel or brass. End 52 of member 50 is furnished with a suitable opening 54 for acommodating base bracket projection 49, the opening preferably being dimensionally greater in width than the width of the projection to permit the multiplanar movement of member 50 as it pivots from one angular position to another. Moreover, slot 48 of bracket 42 should be sufficiently large for facilitating the assembly of end 52 of member 50 through slot entrance 55 and onto projection 49. At the free end 53 of member 50 there is included a curved or crowned frictional contact surface 56 for actuation by the rotating push-collar 29 of mechanism 27.

To provide a definite path of travel and positive control of the movement of movable contact 51, end 53 projects through a generally V-shaped channel 57 formed in bracket 43, the slot having its apex 58 located near the outermost portion of the bracket. Preferably, a wear resistant insulating block or plate 59, composed for example of a linen base phenolic graphite loaded material, is mounted in contiguous relation with one face of the bracket, as by rivets 60. Block 59 includes a V-shaped channel 61, aligned with but slightly smaller in over-all size than the corresponding channel 57 of the bracket. With this construction, end 53 will ride on the wear resistant walls of block channel 61 which defines the path of travel for end 53 of member 50, and consequently for movable contact 51. The portion of member 50 which rides in channel 61, indicated at 63, preferably is of reduced width having bent over edges 64 and 65 and an extruded central part 66 to insure a smooth area of engagement between the walls of block channel 61 and member 50, as well as to strengthen portion 63 of member 50.

From FIGS. 1 and 3, it will be seen that in the illustrated embodiment of switch assembly 30, a coil spring 70, normally under compression, is utilized to urge the crowned surface 56 toward push-collar 29 and to hold projection 49 and end 52 of member 50 in a firm assembled, pivotal relation, which insures the effective transmission of electrical energy between base 41 and member 50. Spring 70 is maintained in position, interposed between the ends of member 50, by a protuberance 71 furnished in body portion 72 of member 50 to engage the upper end of the spring and by opening 73 provided in flat base section 44, which accommodates the lower end thereof. It should be noted that in the form shown, member 50 has its body portion 72 substantially parallel to base section 44 when portion 63 of member 50 is being maintained in the apex of channel 61 by the bias of spring 70.

It will be appreciated from the description of the switch assembly 30 outlined so far that the fabrication of the component parts of assembly 30 is exceedingly simple, requiring only low cost stamping and bending operations with little waste of material. Further, once base 41 has been secured to terminal board 31, the assembly of member 50 with the base may easily be accomplished with the minimum expenditure of labor. For instance, after surface 56 of member 50 has been placed through aligned channels 57, 61, end 52 may readily be inserted through slot entrance 55 into its assembled position and spring 70, held under compression, finally added to the unit to retain member 50 in place. This type of assembly has the additional advantage of permitting the quick replacement of switch operating member 50 should the need ever arise after a long period of switch operation.

In the embodiment of the present invention shown by FIGS. 1–5 inclusive, switch operating member 50 of switch assembly 30 not only cooperates alternately with a pair of spaced apart slightly yieldable contact elements 75 and 76, respectively connected in circuit with start windings 25 and 26, but in addition, through start elements 75 and 76, it operates contact elements 77, 78 and 79, 80 which control auxiliary circuitry. Each of the elements includes a thin resilient flexible arm carrying a contact at one end thereof. Contact elements 75, 77 and 78 are assembled alternately between four similar insulating blocks or pieces 82 in an upright stacked relation on terminal board 31, adjacent one leg of channel 61, by a pair of screw and nut members, denoted generally by numeral 83. In a similar fashion contact elements 76, 79 and 80 are fastened in stacked relation to board 31 adjacent the other leg of the V-shaped channel.

The specific maner in which the various contact elements are connected in circuit and the operation of the illustrated form of my invention shown in FIGS. 1–4 inclusive are schematically set forth in FIG. 5. The invention, as illustrated in this circuit diagram, is applied to a single phase split phase motor having a capacitor 84 to split the phase for starting purposes in series connection with start windings 25 and 26 respectively through conductors 85 and 86. Terminal parts 35 and 38 are the line terminals of the motor and have their external posts connected to external lines 90 and 91 going to a suitable source of alternating current power source 92. A manual switch 93 is arranged in line 91 to make and break the circuit between source 92 and the motor. The main winding 24 is serially attached between the line terminals. Starting with one side of the line at post 35, the circuit includes conductor 94, protector device 40, conductor 95, the main winding 24, and conductor 96 which is arranged between one end of winding 24 and post 38. Movable contact 51, which places either start winding 25 or 26 in parallel circuit during starting conditions, is electrically joined to line 90. This may readily be accomplished, for example, by connecting one end of conductor 97 to protector device 40 and the other end to a male extension 39 formed on an edge of switch base section 44. Consequently, in view of the firm engaging relation of bracket section 42 with the electrically conductive operating member 50, the circuit is established from one side of the line through base 41 to contact 51.

In FIG. 5, the motor circuit is shown with the various positions for initiating motor operation in one direction, designated as counterclockwise rotation for purposes of illustration, that is, switch 93 is closed and main winding 24 and start winding 26 are energized. Under these conditions, push-collar 29 is in its extended position, shown by the broken lines in FIG. 1, and movable contact 51 is pressed into engagement by the push-collar with contact element 76 to complete the circuit for start winding 26.

For those circumstances which require auxiliary circuit means, e.g., to indicate direction of motor rotation under starting conditions, member 50 may be employed to operate an auxiliary indicator circuit through normally closed contact elements 79 and 80, the free end of the latter element being operatively linked to element 75 by a suitable insulation 99. The auxiliary circuit may be completed from line 91, beyond switch 93, through light 100, lead 101, post 37 through conductor 102 to the normally closed contact elements 79 and 80. Conductor 103 connects element 80 to line 92 via line post 35. Thus, indicator light 100 would be "on" except under counterclockwise starting conditions, when actuator member 50 depresses contact element 75 which, in turn, opens contact elements 79 and 80.

As motor 10 starts up and exceeds a predetermined speed, centrifugal weights 28 overcome the bias of springs 32, moving push-collar 29 axially along shaft 13 to its retracted position (shown in solid in FIG. 1), away from switch assembly 30 and preferably out of contact with switch operating member 50. Spring 70 in turn lifts movable contact 51 away from flexible contact element 76, disrupting the circuit for the start winding 26, and the motor will operate with only the main winding 24 energized. As the inherent resiliency of flexible element 76 raises it to its normal position, normally closed contact elements 79 and 80 will be permitted to engage, closing the light indicator circuit previously described.

Returning once again to the action of switch operating member 50, when push-collar 29 is retracted, the member will pivot around projection 49 in a multiplanar fashion as portion 65 rides upwardly in channel 61 toward the channel apex which limits axial movement of member 50 toward the right, where it is maintained during running conditions of the motor. It will be appreciated from FIGS. 1–4 that spring 70 not only urges portion 63 along the confines of channel 61 toward the channel apex but also concurrently provides the means for maintaining end 52 in a firm assembled relation with base pivot bracket section 42.

Now, if it is desired to stop the motor, it is merely necessary to throw manual switch 93 to the open position, breaking all winding circuits. However, it should be noted that this does not affect the auxiliary light circuit, since it is completed through normally closed contact elements 79, 80 and connected to line 91 beyond switch 93. The rotor 12 gradually slows down until its speed falls below the predetermined value at which time push-collar 29 is returned by tension springs 32 toward the left in FIG. 1 to its extended or normal inoperative position. During the axial travel of push-collar 29, it moves into abutting frictional relation with crowned surface 56 of operating member 50 and drives surface 56 along the confines of channel 61, toward contact element 75, in response to the direction of motor rotation. Consequently, push-collar 29, in effect, moves movable contact 51 in a positive manner into firm engagement with contact element 75. Preferably, element 75, like its counterpart 76, is yieldably urged a slight distance toward base 41 during the engagement period. This movement produces a wiping type of engagement therebetween, resulting a self-cleansing action on the contact faces.

In addition, downward movement of contact element 75 can be utilized, if so desired, to control another auxiliary circuit. To this end, contact elements 77 and 78 are shown as the normally open type, with upper element 77 being operated through insulator 106 by the movement of start contact element 75. A thin sheet of insulating material 62, for instance Mylar, is shown employed on the upper surface of base bight section 44 to provide suitable electrical insulation between the bottom auxiliary contact elements 78 and 80. This second auxiliary circuit may be utilized for controlling electrical units, e.g., relays (not shown), located external of the motor and may have one of the contact elements, 77, attached in series with line 90 through post 35 and lead 107. The other element 78 may be connected by lead 108 to post 36, which has a suitable external lead 109 in circuit with the electrical units.

Conversely, for starting the motor 10 in a reverse direction, that is, for initiating clockwise rotation, switch 93 is again re-closed and start winding 25 is completed through contacts 50, 75 of switch assembly 30. Since clockwise starting and running operation is essentially the same as, but the reverse of, the counterclockwise operation, the explanation already presented of the deenergization of start winding 26 will serve to describe the same action with respect to start winding 25, and member 50 will be raised to the apex of channel 61 once again. Thereafter, when switch 93 is opened to disrupt the main winding circuit, at the predetermined motor speed when centrifugal device 27 is operated to its extended position, the frictional cooperation of push-collar 29 with crowned surface 56 will effect a defined movement of operating member 50 along channel 61 into engagement with start contact element 76 which in turn, through insulator 99, opens light contacts 79, 80. Thus, member 50 is in position to energize start winding 26 for counterclockwise rotor rotation.

It will be recognized by those skilled in the art from the foregoing that my invention, with it s novel features and inherent advantages, is not limited to the embodiment illustrated in FIGS. 1–5 inclusive, but may be varied without a departure from the true scope and spirit of my inventive contribution. For example, FIGS. 6 and 7 show another embodiment in which, for ease of representation, like reference numerals indicate like parts already described, unless otherwise specified. In this modified structure, the switch assembly, shown by numeral 120, includes a pair of fixed or stationary contact elements 121 and 122 which are secured to terminal board 31 on either side of base 41 in the same manner as that set forth for contact elements 75 and 76 of the first embodiment, that is, by mounting one end thereof to the board with a plurality of insulating blocks 82, held in stacked relation by screws 83. A pair of flexible movable contact elements 123 and 124 project freely inwardly from the respective stacks, directly above elements 121 and 122, such that their contacts carried near the free ends thereof are normally in electrical engagement with the adjacent fixed elements. Each movable element is provided with an extension 125 beyond its contact surface, which is positioned in the path of travel of switch operating member 50.

From an inspection of FIG. 6, it will be seen that both base upright bracket section 43 and wear resistance plate 59 are furnished with substantially V-shaped guiding channels 127 and 128, identical to but the reverse of channels 59 and 61 of the first embodiment. More specifically, the apexes 129 of channels 127 and 128 are adjacent flat section 44 of base 41, with the extreme upper ends 131 and 132 of each channel leg disposed outwardly of and centrally between the normally closed movable contact elements 123 and 124 to permit member 50 to move into engagement therewith, forcing the normally closed movable elements 123, 125 to flex away from the stationary contact elements 121, 123.

As in the first embodiment, switch assembly 120 utilizes a resilient means; e.g. compression spring 70, to bias the switch operating member 50 away from base 41 toward push-collar 29 of device 27. The spring tension of spring 70 is greater than that of flexible elements 123 and 124 in order to produce sufficient power to urge each movable contact element to the open position, but the bias of spring 70 is insufficient to resist the axial thrust of push-collar 29 when moved to its extended or inoperative position.

It should be noted that in the second embodiment, neither base 41 nor switch operating member 50 carry electrical current. Consequently, these pieces need not be constructed from electric conductive material and the male extension 39, insulating sheet 62 and movable contact 51 may be dispensed with.

FIGURE 7 illustrates the use of the switch assembly of the second embodiment to connect one side of start windings 25 and 26 with one of the supply lines 90. A two pole double throw switch 135, disposed externally of the motor and connected in line 91, is employed to initiate operation of motor 10 (FIG. 1) and to control its direction of rotation. With the motor at standstill, push-collar 29 will rest in its extended position, holding switch operating member 50 in the apex 129 of guide channel 128 (broken lines in FIG. 7). Thus, both sets of contacts 121, 123 and 122, 124 will be normally closed.

To start the motor in a clockwise direction, movable arms 136, 137 of switch 135 are thrown to the illustrated position to connect the clockwise start winding 25 across power source 92 through supply line 91, stationary contacts 138, 139, of the two pole switch, conductor 140, terminal post 38, conductor 141 to the normally closed contact elements 121, 123 to the one side of start winding 25. The start winding circuit is completed through lead 142, split phase capacitor 84, conductor 143 to line terminal post 35 on terminal board 31 and hence to line 90. In addition, current is supplied to the running winding across terminal ends 146, 147 of switch 135, through conductors 148, 143 and terminal posts 35, 36 to line 90, placing the main winding in parallel circuit with energized starting winding 25. However, it should be noted that start winding 26 is in open circuit since it is connected at one end to the open stationary contacts 151, 152 of switch 135, through normally closed start winding contact elements 122, 124, lead 153, post 37 and conductor 154. In other words, for clockwise rotation, the current is initially supplied in two parallel winding circuits through switch 135 to energize both windings 24 and 25.

As soon as the motor is operated beyond the predetermined speed at which it is desired to remove start winding 25 from the winding circuit, device 27 will retract axially to its retracted or operated position. During this period, spring 70 maintains crowned surface 56 in frictional engagement with push-collar 29, causing member 50 to ride along the walls of channel 128 in the direction of rotation, that is, toward normally closed contact elements 121, 123, which are in the circuit of energized start winding 25 (toward the right in FIG. 7), until it abuts against the extreme end of the channel leg which limits its axial travel. Then as push-collar 29 assumes its operated position, preferably out of engagement with crowned surface member 56, member 50 will be moved into engagement with extension 125 of movable contact element 123, and will flex yieldable element 123 away from engagement with element 121 to disrupt the circuit of starting winding 25.

Consequently, so long as the motor continues running above the momentum required to return push-collar 29 to its unoperated or extended position, only the main winding 24 will be excited, the clockwise running condition being shown by FIG. 7. Every time the motor runs below the actuating speed of device 27, member 50 will be moved away from element 123, allowing elements 121, 123 to close thereby completing the start winding circuit for winding 25 until such time as the critical speed has been reached, whereupon the winding will once again be removed from the motor circuit.

To stop the motor, arms 136, 137 are thrown centrally between stationary contacts 138, 139 and 151, 152 to the "off" position, disconnecting all winding circuits from line 91. After the speed of the motor is reduced sufficiently to permit the push-collar to resume its normal unoperated or extended position, the push-collar will return member 50 to the apex of channel 129. This, in turn, permits the spring tension of element 123 to close elements 121, 123.

Conversely, for counterclockwise or reverse motor operation, arms 136, 137 of switch 135 are moved into engagement with stationary contacts 151, 152 to energize the main winding and start winding 26. With device 27 rotating in a counterclockwise fashion, push-collar 29 will operate member 50, through frictional engagement with it, in the direction of rotation, i.e., into contact with yieldable element 124 to deenergize start winding 26. Since the counterclockwise starting and running operation is merely the reverse of that already set forth for the clockwise direction, the explanation relative to the energization and deenergization of start winding 25 will serve for that of start winding 26.

In either the clockwise or counterclockwise operation of motor 10, placing arms 136, 137 of switch 135 in the "off" position will result in the centrifugal device to resume its normal inoperative condition in which member 50 will be urged in channel apex 129 by push-collar 29, thereby permitting the closing of start winding contact elements 121, 123 and 122, 124. Even though switch operating member 50 in the second embodiment does not operate contact elements for auxiliary circuits, it should be recognized by those skilled in the art that, if so desired, switch assembly 120 of FIGS. 6 and 7, may incorporate means for controlling devices other than the start windings of the motor.

From the foregoing, it will be seen that the present invention provides an extremely simple, inexpensive, and inherently durable arrangement for effecting reverse rotation of a single phase motor. The switch itself, while being economical to manufacture and to install, is capable of repeated operation, due in part to the type of positive or controlled travel of the switch actuating component incorporated in the switch, without danger of mechanical failure.

It should be apparent to those skilled in the art, while I have shown and described what at present is considered to be the preferred embodiments of my invention in accordance with the Patent Statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. In a single phase reversible motor, a switch assembly comprising a stationary support having a base, at least two spaced apart contact elements carried by said stationary support, a switch operating member for moving electrical means into and out of selective engagement with said elements, means for pivotally mounting one section of said member to said support, said stationary support having upright means including a generally V-shaped channel having separated legs extending away from said base, for guiding the movement of a second section of said member generally toward and away from said base, the second section of said member projecting through said channel and arranged to be alternately moved along the legs of said channel in a predetermined direction.

2. In a single phase reversible motor, a switch assembly comprising at least two spaced apart contact elements, a stationary support having a pair of outstanding brackets, a switch operating member for moving electrical means into and out of selective engagement with said elements, one of said brackets formed with means for guiding the movement of one end of said switch operating member, the other bracket including means for movably supporting the other end of said switch operating member, and means carried by said support intermediate said brackets in engagement with said member normally biasing the one end of said member away from said stationary support and concurrently maintaining the other end of said member in assembled relation with said other bracket.

3. In a single phase reversible motor, a switch assembly comprising at least two spaced apart contact elements, a base having a pair of outstanding brackets, a switch operating member for moving electrical means into and out of selective engagement with said contact elements, one of said brackets having means including a channel formed with at least one leg extending generally away from said base for guiding the movement of one section of said switch operating member, the other bracket formed with a slot having a projection formed on the upper wall thereof, a second section of said member movably accommodating said projection, and spring means normally biasing said one section of said member away from the base while concurrently maintaining the second section of said member in assembled relation with said bracket projection.

4. In a single phase reversible motor, a switch assembly comprising at least two spaced apart contact elements, a base having a pair of outstanding brackets formed in one piece, a switch operating member for moving electrical means into and out of selective engagement with said contact elements, one of said brackets formed with a generally V-shaped channel having its apex disposed away from said base, one end of said switch operating member projecting through said channel, the other bracket having a slot with a projection formed on the upper wall thereof, the other end of said member movably accommodating said projection, and a spring held under compression between said base and one side of said member intermediate its ends, said spring normally biasing one end of said member toward the apex of the channel while concurrently maintaining the other end of said member in assembled relation with said bracket projection.

5. In a single phase reversible motor having a speed responsive switch actuating device, a switch assembly comprising at least two spaced apart contact elements, a switch operating member for moving electrical means into and out of selective engagement with said spaced apart elements, a stationary support having a base, means for pivotally attaching one end of said member with said support, means for guiding said member into said selective engagement comprising a channel formed by a pair of spaced apart leg portions and a portion joining the legs together at one end thereof with the leg portions of said channel projecting generally away from said support base, the other end of said member projecting through said channel and arranged to be driven along said channel in a predetermined direction in response to movement of the speed responsive device.

6. In a single phase reversible motor having a speed responsive switch actuating device, a switch assembly comprising at least two spaced apart contact elements, a switch operating member composed of electrical conductive material carrying a contact intermediate its ends, a base having a pair of spaced apart outstanding brackets, means movably attaching one end of said member to one of said brackets, the other bracket having means including a wear resistant block formed with a substantially V-shaped channel with the apex of the channel disposed away from said base, the other end of said switch operating member projecting through said channel and arranged to be moved along said channel by the speed responsive device, and means normally biasing said member toward the apex of said channel and the contact of said member out of engagement with said spaced apart contact elements, said switch operating member having means arranged to be frictionally engaged by the actuating device whereby a predetermined axial movement of the speed responsive device will overcome said biasing means and drive said member from the channel apex into selective engagement with one of said spaced apart contact elements.

7. In a single phase reversible motor having a speed responsive switch actuating device, a switch assembly comprising a stationary support, at least two pairs of spaced apart contact elements carried by said support, each of said pairs including movable and stationary contact elements, switch operating member arranged to be actuated by the speed responsive device, means for pivotally attaching one end of said member with said support, means for guiding said member into selective engagement with said movable contact elements to operate said movable elements, including a generally V-shaped channel having its apex disposed toward said support, the other end of said member projecting through said channel and arranged to be moved along said channel by the speed responsive device.

8. In a single phase reversible motor having a speed responsive switch actuating device, a switch assembly comprising at least two pairs of spaced apart contact elements, each of said pairs including movable and stationary contact elements normally biased to the closed position, a switch operating member arranged to selectively open said elements, a base having a pair of spaced apart outstanding brackets, means movably attaching one end of said member to one bracket, the other bracket having means including a wear resistant block formed with a substantially V-shaped channel with its apex disposed toward said base, the other end of said switch operating member projecting through said channel and arranged to be moved along said channel by the speed responsive device, and means biasing said member away from the apex of said channel and into engagement with one of the movable contact elements to selectively open one pair of said elements, said switch operating member adapted to be moved out of engagement with the movable contact element by the speed responsive device and into the apex of the channel thereby overcoming the biasing means whereby both of said pair of contact elements are in the closed position when the motor operates below a predetermined speed.

9. In a single phase motor having energizing windings, a speed responsive switch actuating mechanism having a member axially movable in response to the speed of the motor; a switch assembly mounted in the motor in cooperative relation to the speed responsive mechanism; said switch assembly comprising at least two spaced apart contact elements, movable electrical means arranged to make contact with said elements, a switch operating member for moving said electrical means into and out of selective engagement with said elements, and a support mounting said switch operating member formed with a pair of spaced apart bracket sections joined together at one end by a bight section, at least one of said bracket sections projecting generally towards said speed responsive mechanism and having a channel for guiding said switch operating member as it moves said electrical means into and out of the selective engagement with the elements, said channel being formed by a pair of spaced apart leg portions and a portion connecting the leg portions together at one end with the leg portions of said channel extending away from said bight section of said support, means pivotally attaching one end of said switch actuating member to the other of said brackets, the other end of said switch actuating member extending through said channel and arranged to be driven along said channel leg portions by the axially movable member of said actuating mechanism in response to the speed of the motor.

10. In a single phase motor having energizing windings, a speed responsive switch actuating mechanism having a member axially movable in response to the speed of the motor; a switch assembly mounted in the motor in cooperative relation to the speed responsive mechanism; said switch assembly comprising at least two spaced apart contact elements, movable electrical means arranged to make contact with said elements, a switch operating member engaging said electrical means for moving said electrical means into and out of selective engagement with said elements, and a support mounting said switch operating member formed with a pair of spaced apart upright brackets and a base section, at least one of said bracket sections projecting generally towards said speed responsive mechanism and having a channel for guiding said switch operating member as it moves said electrical means into and out of the selective engagement with the elements, said channel being formed by a pair of spaced apart leg portions and a portion connecting the leg portions together at one end, with the leg portions of said channel extending away from said base section of said support, means pivotally attaching one end of said switch operating member to the other of said brackets, the other end of said switch operating member extending through said channel and arranged to be driven along said channel leg portions by the axially movable member of said actuating mechanism in response to the speed of the motor, and resilient means engaging said base section and said switch operating member intermediate the brackets for continuously biasing said other end of said switch actuating member guided by said channel toward said switch actuating mechanism.

References Cited by the Examiner

UNITED STATES PATENTS

| | | | |
|---|---|---|---|
| 1,865,697 | 7/32 | Karrer | 200—6 |
| 2,149,108 | 2/35 | Welch | 200—80 |
| 2,586,734 | 2/52 | Sprague et al. | 200—80 |
| 2,598,440 | 5/52 | Reek | 200—80 |
| 2,683,844 | 7/54 | Schaefer | 318—207 |
| 2,701,855 | 2/55 | Hammes | 318—207 |
| 2,767,274 | 10/56 | Ritter | 200—80 |
| 2,812,401 | 11/57 | Waters | 200—80 |
| 2,831,153 | 4/58 | Deming et al. | 318—207 |

FOREIGN PATENTS 569,965   6/45   Great Britain.

BERNARD A. GILHEANY, *Primary Examiner.*

JOHN F. COUCH, *Examiner.*